US 6,633,405 B1

(12) United States Patent
Nguyen

(10) Patent No.: US 6,633,405 B1
(45) Date of Patent: Oct. 14, 2003

(54) METHOD AND APPARATUS FOR INTERFACING GENERIC AND DEVICE-SPECIFIC CONTROL CODES

(75) Inventor: Linh H. Nguyen, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/465,849

(22) Filed: Dec. 17, 1999

(51) Int. Cl.[7] .................. G06F 3/12; G06F 12/00; G06K 15/02
(52) U.S. Cl. ............... 358/1.16; 358/468; 358/1.17
(58) Field of Search ............... 358/468, 409, 358/1.16, 1.13, 1.17; 710/5–9

(56) References Cited

U.S. PATENT DOCUMENTS

| | | | |
|---|---|---|---|
| 4,998,960 A | * | 3/1991 | Rose et al. .................. 84/602 |
| 5,402,528 A | * | 3/1995 | Christopher et al. ......... 358/1.9 |
| 5,537,517 A | * | 7/1996 | Wakabayashi et al. ..... 358/1.16 |
| 5,699,494 A | | 12/1997 | Colbert et al. |
| 5,726,770 A | | 3/1998 | Harada |
| 5,758,124 A | | 5/1998 | Ogata et al. |
| 5,790,860 A | | 8/1998 | Wetmore et al. |
| 5,809,554 A | | 9/1998 | Benayon et al. |
| 5,813,026 A | | 9/1998 | Borg et al. |
| 5,860,156 A | | 1/1999 | Williams |
| 5,878,275 A | | 3/1999 | Okada et al. |
| 5,915,078 A | | 6/1999 | Miyasaka et al. |
| 5,937,150 A | * | 8/1999 | Phan ....................... 358/1.15 |

FOREIGN PATENT DOCUMENTS

| | | | |
|---|---|---|---|
| GB | 2 220286 A | 1/1990 | ............ B41J/25/00 |
| GB | 2334606 A | 8/1999 | ........... G06K/15/00 |

* cited by examiner

*Primary Examiner*—Edward Coles
*Assistant Examiner*—Alan Rahimi

(57) ABSTRACT

A fax machine includes a print controller, a fax controller and random access memory. Generic control code is stored in ROM of the print controller, and paper path code is stored in ROM of the fax controller. Upon startup of the fax machine, the fax controller passes copies of paper path code functions and variable values to the print controller. The print controller, in turn, writes the variable values to a jump table in the random access memory, writes the functions to designated portions of the random access memory, and writes starting addresses of the functions to the jump table. During operation of the fax machine, the print controller executes the generic control code and uses the jump table to access the variable values and to execute the functions. Thus, the jump table allows the print controller to interface the generic control code with the device-specific variable values and the functions.

19 Claims, 4 Drawing Sheets

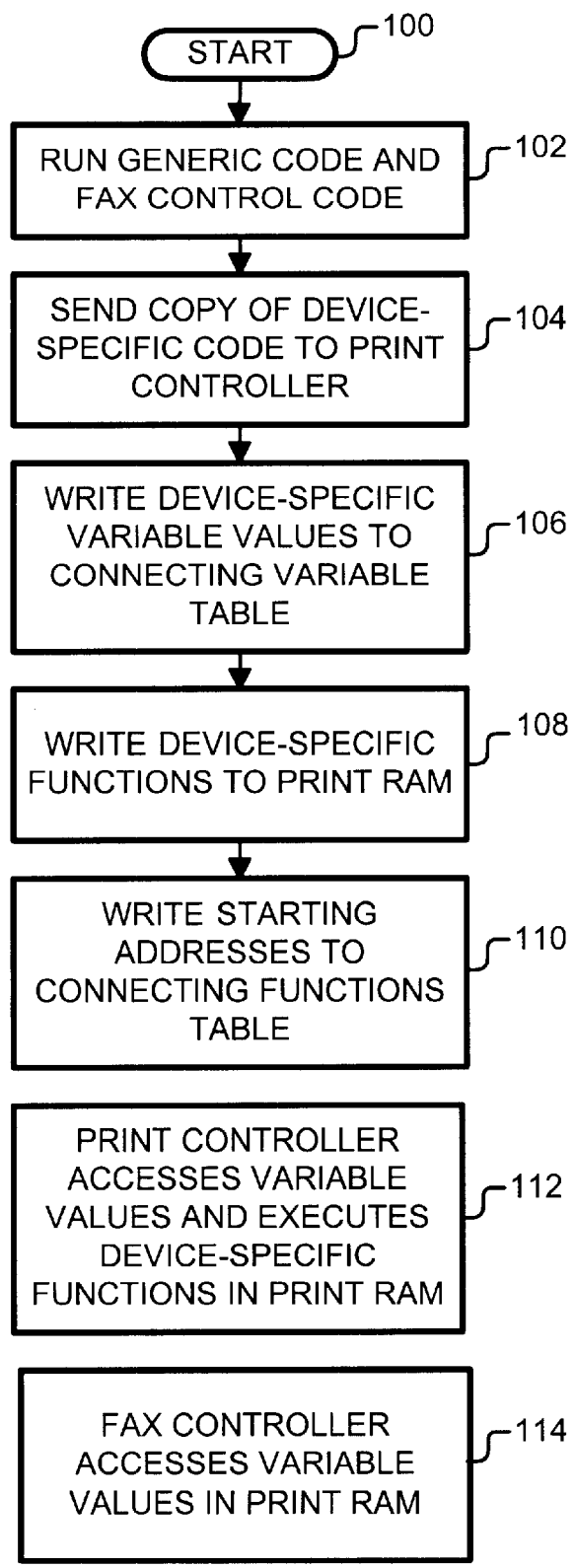

METHOD AND APPARATUS FOR INTERFACING GENERIC AND DEVICE-SPECIFIC CONTROL CODES

BACKGROUND OF THE INVENTION

The invention relates to fax machines, printers, multifunction machines and other machines having print engines. More specifically, the invention relates to print controllers and code development for such machines.

During manufacture of fax machines, printers, multifunction machines and other machines including print engines, an original equipment manufacturer ("OEM") purchases a "core." The core typically includes print head drives, paper motor drives, carriage motor drives, paper sensors and flags, and controllers programmed with basic functions and variable values to control these core printing devices. The OEM then adds certain features to the core to produce a finished product. For example, different OEMs might add different cases and different paper path mechanisms to their fax machines.

The OEM may purchase some or all of these core components from a vendor. At a minimum, however, the OEM typically purchases, a print controller and print read-only memory ("ROM") from the vendor because these components control the very basic, or low level, functions of the core printing devices. The remaining core components may be purchased from sources other than the print controller vendor.

The print ROM stores control code for controlling the print engine. The control code includes "generic" executable code and device-specific executable code.

During code development, the vendor generates the control code. If the OEM purchases core printing devices from a source other than the vendor, the device-specific code generated by the vendor might be different from the specific paper path of the OEM design.

The current practice is for the vendor to supply portions of source code to the OEM, and let the OEM modify the source code and determine final functions and variable values that work with the OEM's machine. If the default paper path is different than the paper path used by the OEM, the OEM modifies the vendor-supplied variable values and paper path functions. Once the device-specific code has been developed by the OEM, the OEM sends the modified device-specific source code (including the modified variable values and paper path functions) to the vendor. The vendor then compiles the entire source code, burns the compiled code into the print ROM, and delivers the print ROM back to the OEM. The print ROM is mounted in the OEM's machine.

Three problems are inherent in such code development. First, the vendor provides generic source code to the OEM, and the OEM provides device-specific source code to the vendor. Thus, each party exposes valuable intellectual property to the other. However, this approach is not desirable for a party who desires to protect its source code.

Second, the code development is performed sequentially, which takes time. Developing the vendor and OEM code in parallel would be faster and more efficient.

Third, the vendor customizes its print ROM for each OEM. Providing different print ROMs to different OEMs can be costly to the vendor.

SUMMARY OF THE INVENTION

These problems are overcome by the present invention. According to one aspect of the present invention, an apparatus includes a print engine having a first controller and scratch memory. A portion of the scratch memory is reserved for a jump table. The apparatus further includes a second controller. During startup of the apparatus, the second controller passes variable values and functions to the print controller. The print controller writes the variable values to specific locations in the jump table. The print controller also writes the functions to the scratch memory and writes starting addresses of these functions to specific locations in the jump table. The print controller uses the jump table to access the variable values and execute the functions. Thus, the jump table allows the second controller to share variables and functions with the first controller. Such an architecture allows code to be developed more efficiently. It also allows code to be protected, and the manufacturing cost of the print controller to be reduced.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 3 is an illustration of a method of interfacing generic code with device-specific code during operation of the fax machine;

DETAILED DESCRIPTION OF THE INVENTION

Figure 1:
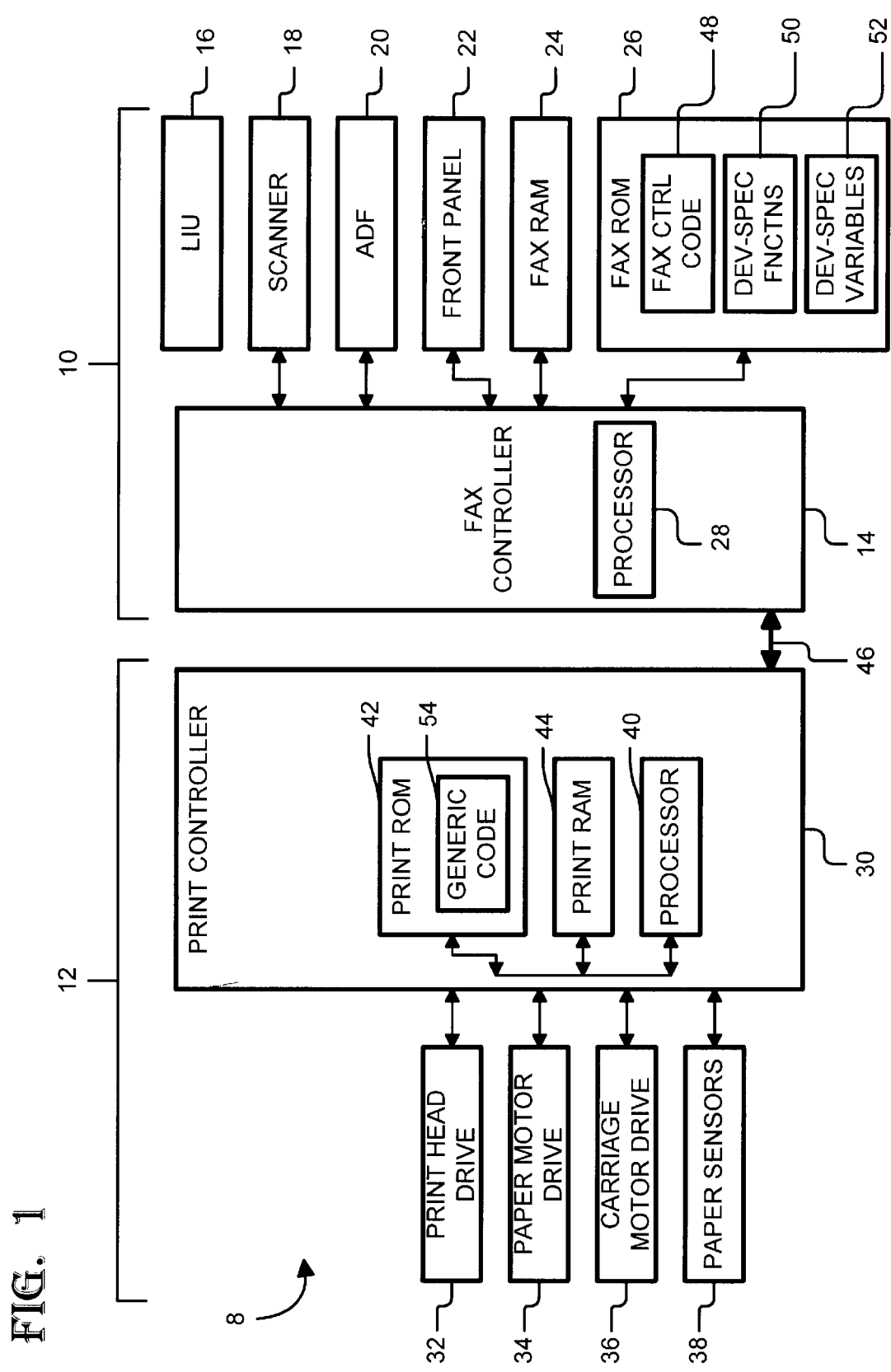
FIG. 1 is an illustration of a fax machine in accordance with the present invention.

As shown in the drawings for purposes of illustration, the present invention is embodied in a fax machine including a print controller, a fax controller, and random access memory. The print controller includes a print ROM for storing generic code, and the fax controller includes a fax ROM for storing device-specific code. The print controller creates a jump table in the random access memory to interface the generic code with the device-specific code. A vendor develops the generic code and default device-specific code. An OEM is free to use the default device-specific code or develop device-specific code of its own. Partitioning the generic code and the device-specific code in such a manner allows an OEM to modify the device-specific code without needing details of the generic code. Thus, the vendor need not submit its generic source code to the OEM. Moreover, the OEM need not submit its device-specific source code to the vendor. Therefore each party can protect its code.

Additionally, the OEM and vendor can develop code in parallel. Therefore, code development efficiency is increased and code development time is reduced.

Such an architecture allows the vendor to produce a single print ROM that can be distributed to different OEMs. The vendor need not customize the print ROM for each OEM; therefore, manufacturing cost is reduced. Moreover, the OEM can embed the print ROM in the print controller, which further reduces manufacturing costs.

FIG. 1 illustrates a fax machine 8 including a fax engine 10 and a print engine 12. The fax engine 10 includes a fax controller 14 and various fax and scanning devices that are controlled by the fax controller 14. The fax and scanning devices include, but not limited to a line interface unit 16, a scanner 18, an automatic document feeder 20, a front panel 22, fax ROM 24 and fax random access memory ("RAM") 26. The fax controller 14 may be implemented on an Application Specific Integrated Circuit ("ASIC") having an embedded processor 28.

The print engine 12 includes a print controller 30 and various core printing devices such as a print head drive 32, a paper motor drive 34, a carriage motor drive 36, and paper sensors and flags 38. The print controller 30 includes an embedded processor 40, embedded print ROM 42, and embedded print RAM 44. The fax controller 14 and the print controller 30 communicate via a bi-directional link 46.

The print ROM 42 stores generic executable code 54. The fax ROM 24 stores fax control code 48 and device-specific control code 50, 52 for the core printing devices. The device-specific control code includes device-specific functions 50 and device-specific variable values 52. The generic code 54 calls the device-specific functions 50 and uses the device-specific variable values 52 to control the core printing devices 32 to 38.

A portion of the print RAM 44 is reserved for a jump table, which includes a Connecting Variable Table and a Connecting Functions Table. The print controller 30 creates the jump table and uses the jump table to interface the generic code 54 with the device-specific code 50, 52.

Figure 2:
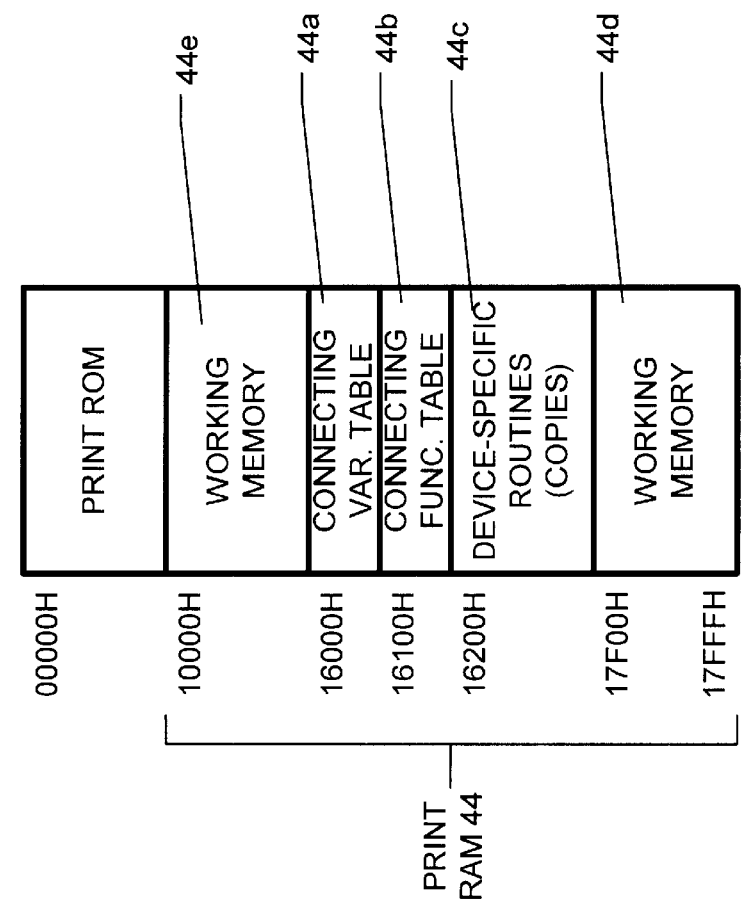
FIG. 2 is an illustration of a memory map for print ROM and print RAM of the fax machine.

Reference is now made to FIG. 2, which shows an example of a memory map for the print ROM 42 and the print RAM 44. The print ROM 42 and the print RAM 44 may occupy a contiguous memory address space from 00000 Hex to 17FFF Hex where the print ROM 42 is 64 Kbytes in size. The Connecting Variable Table 44a and the Connecting Functions Table 44b may each occupy 256 bytes of the RAM 32. A 7424 byte portion 44c of the print RAM 44 may be reserved for copies of the device-specific functions 50. The remaining 24 Kbyte and 256 byte portions 44d and 44e of the print RAM 44 may be used as working memory for the print processor 40 to execute the generic code 54 and a copy of the device-specific code 52, 54.

Additional reference is now made to FIG. 3, which describes how the print controller 30 creates the jump table and uses the jump table to interface the generic code 54 with the device-specific code 50, 52. Upon startup of the fax machine 8 (block 100), the printer controller 30 executes its generic code 54, and the fax controller executes its fax control code 48 (block 102). The fax controller 14 sends a block of data to the print controller via the link 46 (block 104). The block includes a copy of the device-specific code 50, 52.

The print controller 30 knows how to parse the block and store the copies of the functions 50 and variable values 52 in the print RAM 44. The device-specific variable values 52 are stored in pre-designated locations of the print RAM 44, thereby creating the Connecting Variable Table 44a (block 106). During normal operation of the fax machine 8, the generic code 54 will instruct the print processor 40 for look for these device-specific variable values at their pre-designated locations in the Connecting Variable Table 44a. TABLE 1 shows a portion of an exemplary Connecting Variable Table for the fax machine 8.

TABLE 1

| Index | Description | Value (Default or Variable) |
|---|---|---|
| 0 | System Revision | 0x5A4C006 or SYS_REVISION |
| 1 | Load sequence address | 16200Hex or LOAD_ADDRESS |
| 2 | Eject Distance | 1200*4 or EJECT_DISTANCE |
| *** | | |
| 27 | OOPS type flag | OOPS_3_STATE |

For example, during startup, the print controller 30 stores a value for eject distance in the print RAM location designated for the eject distance. During normal operation, when the print controller 30 needs to know the number of steps for the motor drive 34 to move a sheet of paper into an output tray, it uses the eject distance value stored in Connecting Variable Table 44a.

The print controller 30 stores the device-specific functions 50 in the designated portion 44c of the RAM 44 (block 108) and the starting addresses of the functions 50 in pre-designated locations in the Connecting Functions Table 44b (block 110). Because the memory requirements for device-specific functions may vary (for instance, the OEM might modify a specific function and thereby increase its memory requirement), the print controller 30 uses the Connecting Functions Table 44b to identify the starting addresses of the functions stored in the designated portion 44c of the print RAM 44. During normal operation of the fax machine 8, the generic code 54 will instruct the print processor 40 to pass control to these device-specific functions at their starting addresses indicated in the Connecting Functions Table 44b. TABLE 2 shows a portion of an exemplary Connecting Functions Table 44b for the fax machine 8.

TABLE 2

| Index | Address for the following Functions |
|---|---|
| 0 | RAM address for function ReadSensors |
| 1 | RAM address for function MovePaperAnd Update VCAP |
| 2 | RAM address for function BeyondPageBottom |
| *** | |
| 11 | RAM address for function StartNewSequence |

For example, during startup, the print controller 30 stores a "ReadSensors" function in the designated portion 44c of the print RAM 44. The print controller 30 also stores the starting address of the ReadSensors function in the Connecting Functions Table 44b at the location designated for the ReadSensors function. Whenever the generic code 54 calls the ReadSensors function, the print processor 46 passes control to the starting address indicated in the ReadSensors entry of the Connecting Functions table 44b.

During normal operation of the fax machine 8, the generic code 54 instructs the print processor 40 to look for device-specific variable values at their designated locations in the Connecting Variable Table 44a (block 112). The generic code 54 also instructs the print processor 40 to execute device-specific functions by passing control to the starting address in the Connecting Function Table 44b (block 112).

Thus, the jump table allows the fax controller 14 to share the device-specific functions 50 and variables 52 with the print controller 30 during operation of the fax machine 8. However, the jump table also allows the print controller 30 to share information with the fax controller 14 (block 114). The fax controller 14 may access values that the print controller 30 writes to the Connecting Variable Table 44b. For example, the fax controller 30 can look at the OOPS flag to determine whether the fax machine 8 is out of paper.

Figure 4:
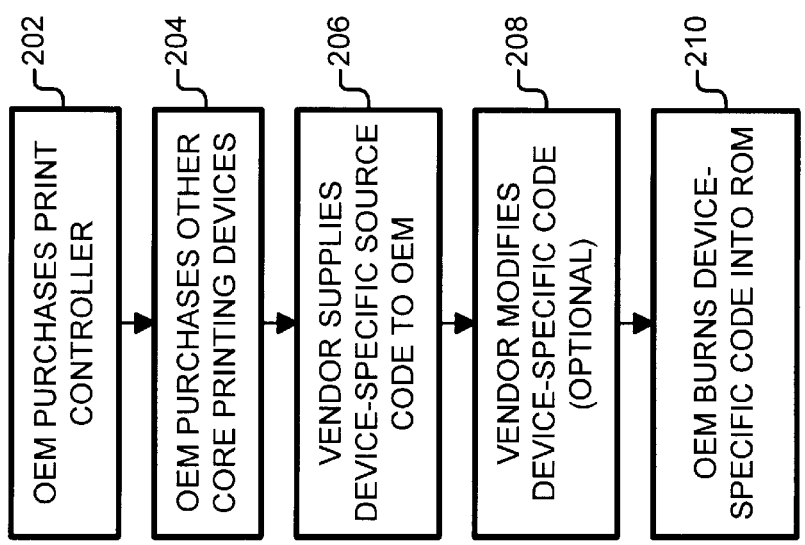
FIG. 4 is an illustration of a method of developing control code for a print engine of the fax machine.

Reference is now made to FIG. 4. During code development for the fax machine 8, the OEM typically purchases the print controller 30 from a vendor (block 202). The OEM may purchase the remaining components from the vendor of the print controller 30 or from sources other than the vendor of the print controller 30 (block 204).

The print controller 30 is embedded in an ASIC along with print ROM 42 and the print RAM 44. The vendor supplies default device-specific source code to the OEM (block 206). The OEM is free to use the default device-specific source code. If, however, the OEM purchases components from different vendors, the functions and variable values of the default device-specific source code might not work properly with the mix of components.

Therefore, the OEM may optionally modify the default device-specific source code (block 208). After the OEM has settled on device-specific source code (modified or unmodified), the OEM compiles the device-specific source code and "burns" compiled code 50, 52 in the fax ROM 26 (block 210). The default source code will indicate where the functions and variables should be stored in the fax ROM 26. If the OEM modifies the device-specific source code 50 or 52, the OEM will burn the modified functions and variable values at the same locations as the corresponding default functions and variable values. Essentially, the OEM will replace the default functions and variable values with the modified functions and variable values. This will allow the print controller 30 to identify the variable values and functions that are passed to it by the fax controller 14 during startup of the fax machine 8.

If the OEM makes changes to the device-specific code, the vendor's generic code 54 in the print ROM 40 need not be updated. Moreover, the OEM need not disclose the modified device-specific code to the print controller vendor. The OEM need not even notify the print controller vendor that the default device-specific code was modified. The print controller vendor will not know whether the machine 8 is executing the default device-specific code or modified device-specific code.

The print controller vendor need only disclose the device-specific code to the OEM. The generic code need not be disclosed to the OEM. Thus, the print controller vendor can protect its generic code, and the OEM can protect its modified device-specific code.

Additionally, the print controller vendor can modify its generic code 54 while the OEM modifies its device-specific code 50, 52. Either party can change its code on the fly. Because code development can proceed in parallel, code development efficiency is increased and code development time is reduced.

The vendor can produce a single print ROM for distribution to different OEMs. The vendor need not customize the print ROM 42 for each OEM; therefore, manufacturing cost is reduced. Moreover, the OEM can embed the print ROM 42 in the print controller ASIC, which further reduces manufacturing cost.

The same print controller 30 may be used for a fax machine, a printer or other machine having a print engine. Thus, the vendor need not even customize the print controller 30 for different types of machines.

Figure 5:
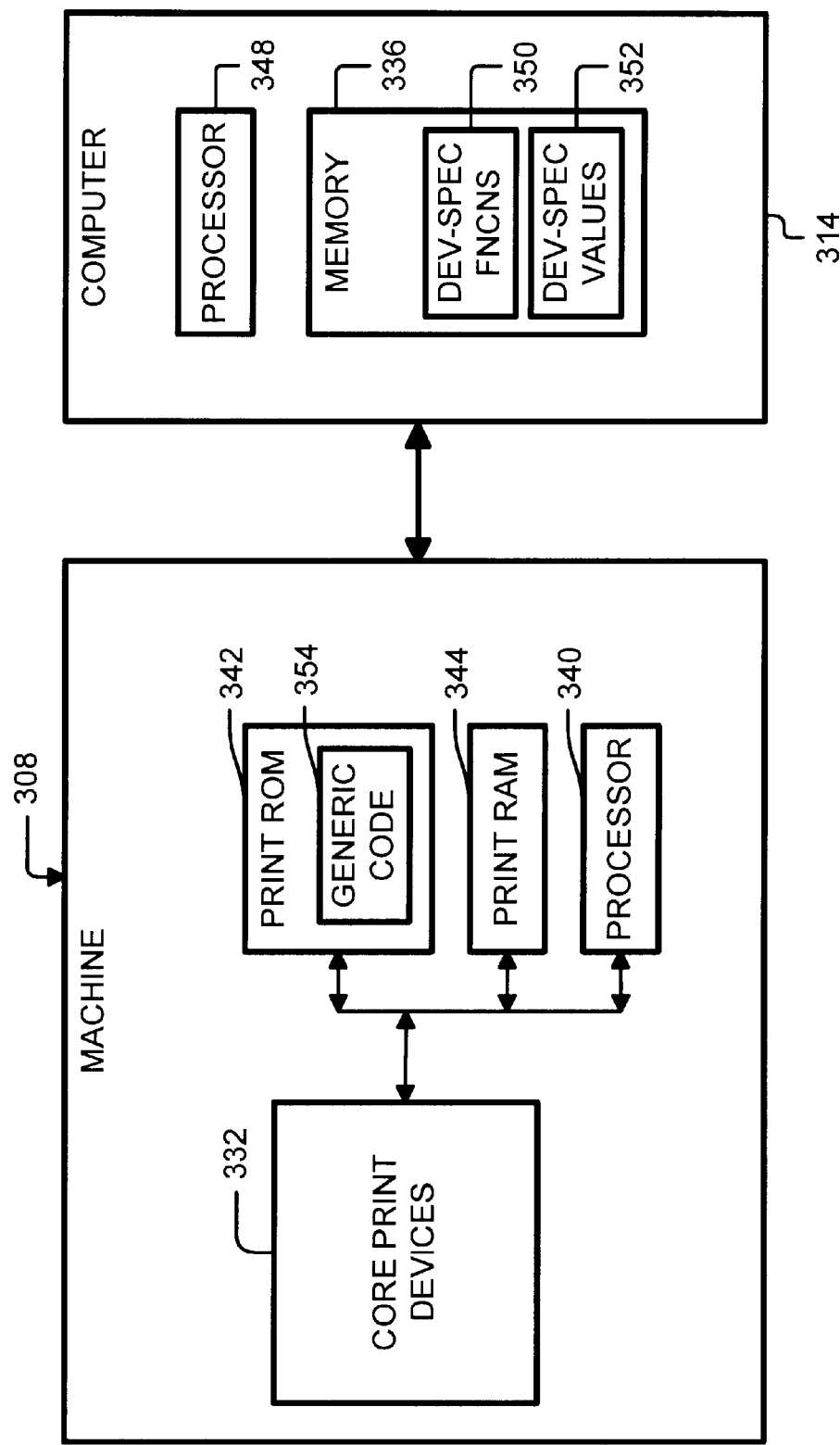
FIG. 5 is an illustration of another machine in accordance with the present invention.

Although the invention has been described above in connection with a fax machine 8, it is not so limited. The invention may be applied to any machine having a print engine. FIG. 5 shows a machine 308 including core printing devices 332, print ROM 342, print RAM 344 and a print processor 340. The print ROM 344 stores generic code 354. The device-specific code 350, 352 is stored in persistent memory 336 (e.g., a hard drive) of a computer 314. A computer processor 348 is programmed to send the device-specific code 350, 352 to the machine 308 via a communications port. The print processor 340 creates the jump table in the print RAM 344 and stores copies of the device-specific functions 350 in the print RAM 344. The jump table allows the computer 314 to share device-specific code 350, 352 with the machine 308.

The print engine has been described above in connection with print ROM. However, any type of persistent memory may be used instead of read-only memory.

The invention is not limited to the device-specific functions and variable values described above. Any type of information can be shared with the print controller.

The print controller has been described as writing copies of the device-specific code to RAM. However, the other controller (e.g., the fax controller) can write the copies directly to non-embedded print RAM.

Therefore, the invention is not limited to the embodiments described above. Instead, the invention is construed according to the claims that follow.

What is claimed is:

1. Apparatus comprising:

a print engine including a print controller;

a second controller; and scratch memory;

the second controller passing control code to the print controller during startup of the apparatus, the control code including executable functions and variable values;

the print controller writing the variable values to pre-designated locations in a jump table in the scratch memory, the print controller writing the functions to the scratch memory and starting addresses of the functions to pre-designated locations in the jump table;

the print controller being programmed to access the variable values in the jump table, the print controller also being programmed to use the starting addresses in the jump table to execute the functions stored in the scratch memory.

2. The apparatus of claim 1, wherein the print controller is also programmed to write variable values to the jump table; and wherein the second controller is also programmed to access the variable values in the jump table.

3. The apparatus of claim 1, wherein the print controller includes a first processor and first ROM, the first ROM storing generic control code for the first processor; and wherein the second controller includes a second processor and second ROM, the second ROM storing control code for the second processor, the second ROM also storing the variable values and functions.

4. The apparatus of claim 3, wherein the second controller is a fax controller; wherein the variables and functions include paper path variable values and functions; wherein the fax controller is programmed to pass the paper path variables and functions to the print controller during apparatus startup, wherein the print controller is programmed to write the paper path variable values to designated locations of the jump table; and wherein the print controller is programmed to write the paper path functions to the scratch memory and starting addresses of the paper path functions to designated locations of the jump table.

5. The apparatus of claim 3, wherein the first ROM and the first processor are embedded in a first ASIC.

6. The apparatus of claim 1 wherein the jump table includes a Connecting Variable Table and a Connecting Functions Table.

7. The apparatus of claim 1, wherein the print controller includes a first processor and ROM, the ROM storing executable code for the first processor; and wherein the second controller includes a microprocessor and persistent memory of a computer, the persistent memory storing executable code for the microprocessor, the persistent memory also storing variable values and functions for the print engine.

8. A fax machine comprising:

scratch memory;

a print engine including a print controller, the print controller including a print processor and print ROM; and a fax engine including a fax controller, the fax controller including a fax processor and fax ROM, the fax ROM storing fax control code, device-specific functions and device-specific variable values, the fax control code instructing the fax processor to pass copies of the device-specific functions and device-specific variable values to the print controller during startup of the fax machine;

the print ROM storing generic control code for Instructing the print processor to write the copies of the device-specific variable values to pre-designated locations of a Connecting Variable Table i n the scratch memory, to write the copies of the device-specific functions to the scratch memory, and to write starting addresses of the copied functions to pre-designated locations of a Connecting Functions Table in the scratch memory.

9. The fax machine of claim 8, wherein the generic code also instructs the print processor to write variable values to specific addresses in the scratch memory during startup of the fax machine; and wherein the fax control code also instructs the fax processor to access the variables written to the scratch table by the print processor.

10. The fax machine of claim 8, wherein the device-specific functions and values include functions and values for controlling a paper path of the fax machine.

11. The fax machine of claim 8, wherein the print ROM and the print processor are embedded in an ASIC.

12. A controller for a print engine, the controller comprising:

a processor;

scratch memory; and persistent memory programmed to instruct the processor during startup to receive device-specific code from an external source, copy variable values of the device-specific code to a Connecting Variable Table in scratch memory, copy functions of the device-specific code to the scratch memory, and copy starting addresses of the functions to a Connecting Functions Table in scratch memory.

13. The controller of claim 12, wherein the persistent memory is ROM, and wherein the ROM and the processor are embedded in an ASIC.

14. The controller of claim 12, wherein the persistent memory also stores generic control code, the generic control code instructing the processor to use variable values stored in the Connecting Variable Table and to pass control to functions at starting addresses indicated by the Connecting Functions Table.

15. A method of interfacing generic control code with device-specific variable values and device-specific functions for a print engine, the print engine including a first ROM, second ROM and RAM, the generic control code being stored in the first ROM, the device-specific functions and the device-specific variable values being stored in the second ROM, the method comprising the steps of:

copying the device-specific functions from the second ROM to a designated portion of the RAM;

writing starting addresses of the copied functions to pre-designated locations in the RAM;

copying the device-specific variable values from the second ROM to pre-designated locations in the RAM; and executing the generic control code; wherein the generic control code accesses the RAM to interface with the copies of the device-specific variable values and the device-specific functions.

16. The method of claim 15, wherein the device-specific variable values are copied to a Connecting Variable Table in the RAM, and wherein starting addresses of the device-specific functions are written to a Connecting Functions Table in the RAM.

17. A method of developing code for a machine including a print engine, the print engine including a processor, first persistent memory encoded with generic code and scratch memory, the machine further including second persistent memory, the method comprising the steps of:

accessing device-specific code for the print engine;

copying the device-specific code to the scratch memory;

using the processor to execute the generic code, the generic code instructing the processor to create a jump table in the scratch memory to interface the generic code with the device-specific code, whereby the device-specific code is tested; and storing the device-specific code in the second persistent memory.

18. The method of claim 17, wherein the machine further includes a second processor, wherein the second persistent memory is ROM, the ROM storing control code for the second processor, and wherein the modified device-specific code is also stored in the ROM.

19. The method of claim 17, wherein the device-specific code is modified prior to being stored in the second persistent memory.

* * * * *